United States Patent

Grannis

[15] 3,694,642

[45] Sept. 26, 1972

[54] ADD/SUBTRACT APPARATUS FOR BINARY CODED DECIMAL NUMBERS

[72] Inventor: Norman J. Grannis, Los Angeles, Calif.

[73] Assignee: Computer Design Corporation, Santa Monica, Calif.

[22] Filed: May 4, 1970

[21] Appl. No.: 34,053

[52] U.S. Cl.................................235/170, 340/146.2

[51] Int. Cl...............................G06f 7/50, G06f 7/02

[58] Field of Search..............235/170, 176, 177, 155; 340/146.2

[56] References Cited

UNITED STATES PATENTS

| | | | |
|---|---|---|---|
| 2,823,855 | 2/1958 | Nelson | 235/170 |
| 2,799,450 | 7/1957 | Johnson | 235/176 X |
| 3,083,910 | 4/1963 | Berkin | 235/170 X |
| 2,872,107 | 2/1959 | Burkhart | 235/170 |
| 3,584,206 | 6/1971 | Evans | 235/170 |
| 3,571,582 | 3/1971 | Kelling | 235/170 |

*Primary Examiner*—Malcolm A. Morrison
*Assistant Examiner*—David H. Malzahn
*Attorney*—Lindenberg, Freilich & Wasserman

[57] ABSTRACT

Arithmetic apparatus for operating on signed numbers represented in a binary coded decimal format, whose bits are serially presented, for selectively yielding a binary coded decimal formatted sum or difference as well as relative magnitude information. Corresponding bits from the two numbers being operated upon are applied to the input of a one bit full adder stage. In the case of subtraction, the nine's complement of one of the numbers is formed prior to application to the adder stage. A carry input is also applied to the adder stage which, in the case of an intradigit carry is developed by the adder stage and, in the case of an interdigit carry is developed by a binary-to-binary coded decimal (B/BCD) converter. The B/BCD converter embodies a plurality of one bit delay stages connected in tandem which enable a logic gate network to simultaneously examine, on the fly, a plurality of bits sequentially provided by the adder stage. A circuit for developing the nine's complement of an applied input number similarly utilizes a string of one bit delay stages.

8 Claims, 11 Drawing Figures

INVENTOR.
NORMAN J. GRANNIS

BY Lindenberg, Freilich + Wasserman
ATTORNEYS

| OP | SNA | SNB | SELECT |
|---|---|---|---|
| ADD | + | + | A |
| | + | − | Ac |
| | − | + | Ac |
| | − | − | A |
| SUB | + | + | Ac |
| | + | − | A |
| | − | + | A |
| | − | − | Ac |
| COMP. | + | + | Ac |
| | + | − | A |
| | − | + | A |
| | − | − | Ac |

| IN | | | OUT | |
|---|---|---|---|---|
| PC | PA | PB | SB | CB |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

INVENTOR.
NORMAN J. GRANNIS
BY Lindenberg, Freilich & Wasserman
ATTORNEYS

| DECIMAL DIGIT | IN TRUE T8 | T4 | T2 | T1 | OUT 9's COMPL. K8 | K4 | K2 | K1 |
|---|---|---|---|---|---|---|---|---|
| 0 | 0 | 0 | 0 | 0 | 1 | 0 | 0 | 1 |
| 1 | 0 | 0 | 0 | 1 | 1 | 0 | 0 | 0 |
| 2 | 0 | 0 | 1 | 0 | 0 | 1 | 1 | 1 |
| 3 | 0 | 0 | 1 | 1 | 0 | 1 | 1 | 0 |
| 4 | 0 | 1 | 0 | 0 | 0 | 1 | 0 | 1 |
| 5 | 0 | 1 | 0 | 1 | 0 | 1 | 0 | 0 |
| 6 | 0 | 1 | 1 | 0 | 0 | 0 | 1 | 1 |
| 7 | 0 | 1 | 1 | 1 | 0 | 0 | 1 | 0 |
| 8 | 1 | 0 | 0 | 0 | 0 | 0 | 0 | 1 |
| 9 | 1 | 0 | 0 | 1 | 0 | 0 | 0 | 0 |

(1) $K1=\overline{T1}$ (2) $K2=T2$ (3) $K4=T2\cdot\overline{T4}+\overline{T2}\cdot T4$ (4) $K8=\overline{T2}\cdot\overline{T4}\cdot\overline{T8}$

FIG. 4(A)

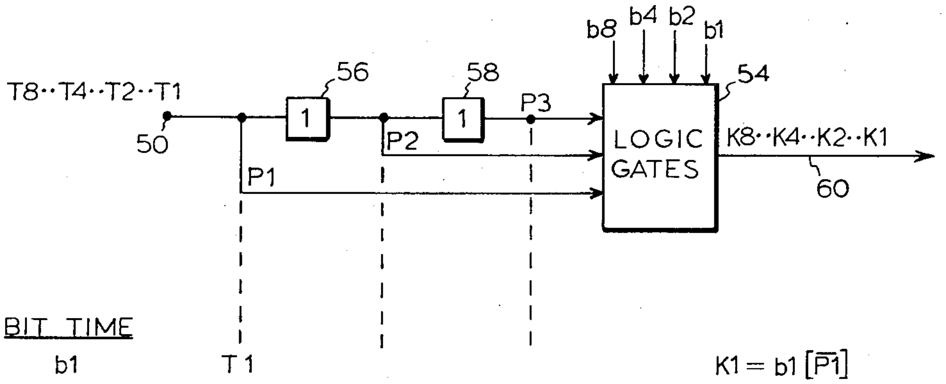

| BIT TIME | | | |
|---|---|---|---|
| b1 | T1 | | |
| b2 | T2 | T1 | |
| b4 | T4 | T2 | T1 |
| b8 | T8 | T4 | T2 |
| b1 | | | |
| b2 | | | |
| b4 | | | |

$K1=b1\,[\overline{P1}]$ $K2=b2\,[P1]$ $K4=b4\,[P2\cdot\overline{P1}+\overline{P2}\cdot P1]$ $K8=b8\,[\overline{P3}\cdot\overline{P2}\cdot\overline{P1}]$

FIG. 4(B)

INVENTOR.
NORMAN J. GRANNIS

BY Lindenberg, Freilich & Wasserman

ATTORNEYS

| | IN BINARY | | | | | OUT BCD | | | | |
|---|---|---|---|---|---|---|---|---|---|---|
| | C8 | S8 | S4 | S2 | S1 | Dc | D8 | D4 | D2 | D1 |
| 0 | 0 | 0 | 0 | 0 | 0 | 0 | 0 | 0 | 0 | 0 |
| 1 | 0 | 0 | 0 | 0 | 1 | 0 | 0 | 0 | 0 | 1 |
| 2 | 0 | 0 | 0 | 1 | 0 | 0 | 0 | 0 | 1 | 0 |
| 3 | 0 | 0 | 0 | 1 | 1 | 0 | 0 | 0 | 1 | 1 |
| 4 | 0 | 0 | 1 | 0 | 0 | 0 | 0 | 1 | 0 | 0 |
| 5 | 0 | 0 | 1 | 0 | 1 | 0 | 0 | 1 | 0 | 1 |
| 6 | 0 | 0 | 1 | 1 | 0 | 0 | 0 | 1 | 1 | 0 |
| 7 | 0 | 0 | 1 | 1 | 1 | 0 | 0 | 1 | 1 | 1 |
| 8 | 0 | 1 | 0 | 0 | 0 | 0 | 1 | 0 | 0 | 0 |
| 9 | 0 | 1 | 0 | 0 | 1 | 0 | 1 | 0 | 0 | 1 |
| 10 | 0 | 1 | 0 | 1 | 0 | 1 | 0 | 0 | 0 | 0 |
| 11 | 0 | 1 | 0 | 1 | 1 | 1 | 0 | 0 | 0 | 1 |
| 12 | 0 | 1 | 1 | 0 | 0 | 1 | 0 | 0 | 1 | 0 |
| 13 | 0 | 1 | 1 | 0 | 1 | 1 | 0 | 0 | 1 | 1 |
| 14 | 0 | 1 | 1 | 1 | 0 | 1 | 0 | 1 | 0 | 0 |
| 15 | 0 | 1 | 1 | 1 | 1 | 1 | 0 | 1 | 0 | 1 |
| 16 | 1 | 0 | 0 | 0 | 0 | 1 | 0 | 1 | 1 | 0 |
| 17 | 1 | 0 | 0 | 0 | 1 | 1 | 0 | 1 | 1 | 1 |
| 18 | 1 | 0 | 0 | 1 | 0 | 1 | 1 | 0 | 0 | 0 |
| 19 | 1 | 0 | 0 | 1 | 1 | 1 | 1 | 0 | 0 | 1 |

(1) $D1 = S1$ (2) $D2 = S2 \cdot \overline{S8} \cdot \overline{C8} + \overline{S2} \cdot C8 + \overline{S2} \cdot S4 \cdot S8$ (3) $D4 = S4 \cdot \overline{S8} + S2 \cdot S4 + \overline{S2} \cdot C8$ (4) $D8 = S2 \cdot C8 + \overline{S2} \cdot \overline{S4} \cdot S8$ (5) $Dc = S2 \cdot S8 + S4 \cdot S8 + C8$

FIG. 6(A)

*INVENTOR.*
NORMAN J. GRANNIS

*BY*
Lindenberg, Freilich & Wasserman

ATTORNEYS

INVENTOR.
NORMAN J. GRANNIS

Lindenberg, Freilich & Wasserman

ATTORNEYS

| | FLIP FLOPS | | | | | OUTPUT | | |
|---|---|---|---|---|---|---|---|---|
| | SNA | SNB | EAC | EQ | ZER | A<B | A=B | A>B |
| (1) | + | + | 0 | 0 | 0 | 0 | 0 | 1 |
| (2) | + | − | 0 | 0 | 0 | 0 | 0 | 1 |
| (3) | − | + | 0 | 0 | 0 | 1 | 0 | 0 |
| (4) | − | − | 0 | 0 | 0 | 1 | 0 | 0 |
| (5) | + | + | 0 | 1 | 1 | 0 | 1 | 0 |
| (6) | + | − | 0 | 1 | 1 | 0 | 1 | 0 |
| (7) | − | + | 0 | 1 | 1 | 0 | 1 | 0 |
| (8) | − | − | 0 | 1 | 1 | 0 | 1 | 0 |
| (9) | + | + | 0 | 1 | 0 | 0 | 1 | 0 |
| (10) | + | − | 0 | 1 | 0 | 0 | 0 | 1 |
| (11) | − | + | 0 | 1 | 0 | 1 | 0 | 0 |
| (12) | − | − | 0 | 1 | 0 | 0 | 1 | 0 |
| (13) | + | + | 1 | 0 | 0 | 1 | 0 | 0 |
| (14) | + | − | 1 | 0 | 0 | 0 | 0 | 1 |
| (15) | − | + | 1 | 0 | 0 | 1 | 0 | 0 |
| (16) | − | − | 1 | 0 | 0 | 0 | 0 | 1 |

INVENTOR.
NORMAN J. GRANNIS
BY
Lindenberg, Freilich & Wasserman
ATTORNEYS

ADD/SUBTRACT APPARATUS FOR BINARY CODED DECIMAL NUMBERS

BACKGROUND OF THE INVENTION

This invention relates generally to digital arithmetic apparatus particularly suited for operating on numbers represented in a binary coded decimal format whose bits are serially presented.

The prior art is replete with various arithmetic arrangements for operating on digitally represented numbers.

SUMMARY OF THE INVENTION

The present invention is directed to an improved arithmetic apparatus particularly suited for operating on signed numbers represented in a binary coded decimal format, whose bits are presented serially, for selectively yielding a binary coded decimal formatted sum or different as well as relative magnitude information. Embodiments of the present invention are useful, for example, in a calculator apparatus of the type disclosed in U. S. Pat. application Ser. No. 885,020, filed on Dec. 15, 1969, now U.S. Pat. No. 3,593,313, entitled "CALCULATOR APPARATUS."

In accordance with a significant aspect of the present invention, the serially presented bits are examined on the fly in order to enable binary coded decimal digits of a sum or difference to be developed within two bit periods of the application of digits of corresponding significance to the arithmetic apparatus input.

In the preferred embodiment of the invention, corresponding bits from the two numbers being operated upon are applied to the input of a one bit full adder stage. In the case of subtraction, the nine's complement of one of the numbers is formed prior to application to the adder stage. A carry input is also applied to the adder stage which in the case of an intradigit carry is developed by the adder stage and in the case of an interdigit carry is developed by a binary-to-binary coded decimal (B/BCD) converter.

In accordance with a further aspect of the present invention, the B/BCD converter and nine's complement circuit each embody a plurality of one bit delay stages connected in tandem which enable a plurality of serially presented bits to be simultaneously examined on the fly by a logic gate network.

In accordance with a still further aspect of the present invention, a comparison means is provided for comparing the relative magnitudes of the two signed numbers being operated upon during a single pass through the apparatus.

The novel features of the invention are set forth with particularity in the appended claims. The invention will be best understood from the following description when read in conjunction with the accompanying drawings.

BRIEF DESCRIPTION OF THE DRAWINGS

FIG. 4A is a truth table illustrating the desired relationship between input and output of the nine's complement circuit of FIG. 1;

FIG. 4B is a block diagram illustrating the preferred implementation of the nine's complement circuit of FIG. 1 to yield the relationship set forth in FIG. 4A;

FIG. 6A is a truth table illustrating the desired relationship between input and output of the B/BCD converter of FIG. 1;

DESCRIPTION OF THE PREFERRED EMBODIMENTS

Figure 1:
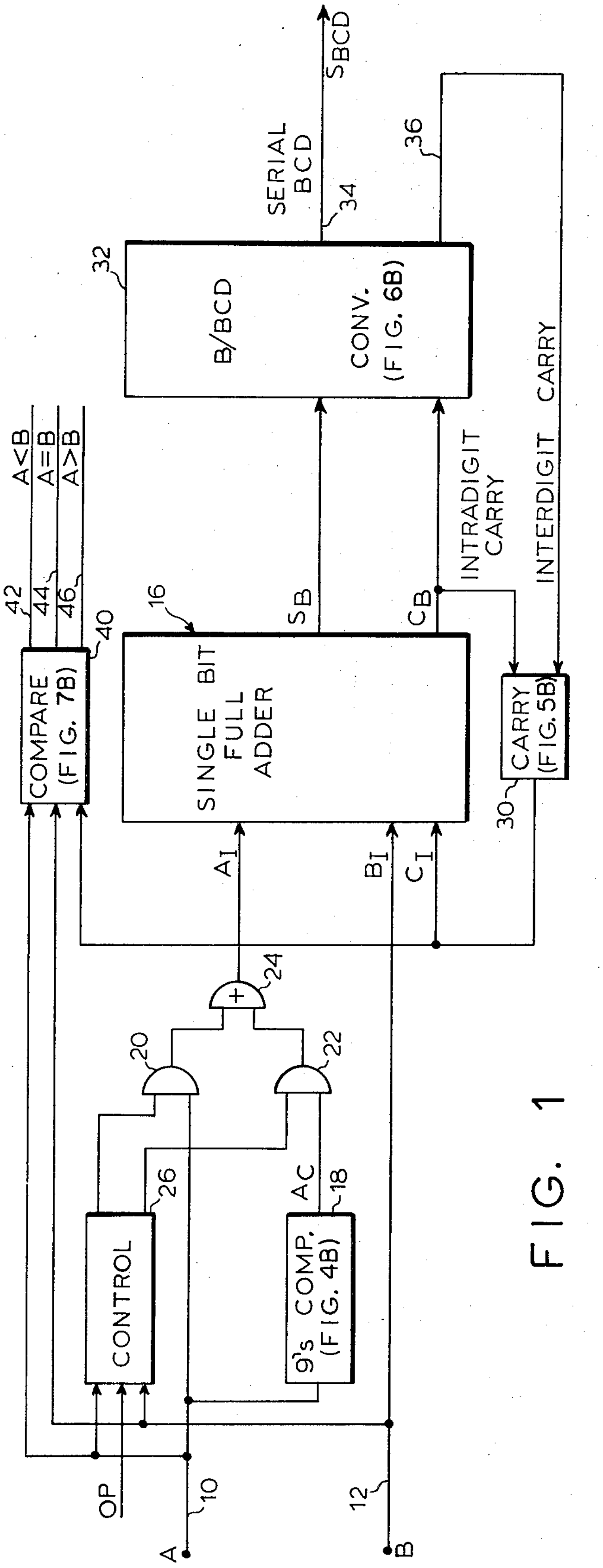
FIG. 1 is a block diagram of a preferred embodiment of the present invention.

Attention is now called to FIG. 1 of the drawings which illustrates a block diagram of a preferred embodiment of arithmetic apparatus in accordance with the present invention. The apparatus of FIG. 1 includes first and second input terminals 10 and 12 intended to have signals respectively representing input numbers A and B applied thereto. As will be explained in greater detail hereinafter in connection with FIG. 2, the input numbers A and B each comprise signed multidigit numbers expressed in binary coded decimal format whose bits are serially presented.

The input terminal 12 is connected directly to an input terminal designated $B_I$ of a single bit full adder stage 16. The input terminal 10 is connected to the input of nine's complement circuit 18 which develops the nine's complement of the signal A which will hereinafter be referred to as $A_c$. Either the signal A available on the input terminal 10 or the signal $A_c$ available from the nine's complement circuit 18 is applied to the input terminal $A_I$ of the full adder stage 16. That is, the signal A is applied to the input of AND gate 20 and the signal $A_c$ is applied to the input of AND gate 22. The outputs of both of these AND gates are applied to the input of OR gate 24 whose output is applied to the input terminal $A_I$ of the full adder stage 16. The determination of whether gate 20 or gate 22 is enabled depends upon the output of a control circuit 26 which is responsive to the type of operation being performed as well as the signs of the numbers A and B. The operation of the control circuit will be discussed in greater detail in connection with FIG. 3. Suffice it to say at this point that the apparatus of FIG. 1 is selectively able to add, subtract and compare the two input numbers respectively applied to the input terminals A and B.

The adder stage 16 has a third or carry input terminal designated $C_I$. The input to this terminal is derived from a carry circuit 30. One input to the carry circuit is derived from the carry output terminal of the full adder stage 16 which is designated as $C_B$. The sum output terminal of the adder stage 16 is designated as $S_B$.

The sum and carry output terminals of the adder stage 16 are applied to the input of a binary-to-binary coded decimal (B/BCD) converter 32. The converter 32 has an output terminal 34 on which is developed the sum (or difference) of the applied input numbers A and B expressed in binary coded decimal format, which may be in true or nines complement form, with the bits thereof being made available serially. The converter 32 also has a carry output terminal 36 on which it develops interdigit carry signals. The term "interdigit carry" is intended to mean a carry from one decimal digit to another in the binary coded decimal format. On the other hand, the carry output terminal of the full adder stage 16 develops "intradigit carries" which refer to carries from one bit position to the next within a four bit group which together represent a single decimal digit in the binary coded decimal format. As will be seen hereinafter, the carry circuit 30 at certain times accepts the intradigit carry from the adder stage 16 and at other times accepts the interdigit carry from the converter 32 for subsequent application to the carry input terminal $C_I$ of the adder stage 16.

The apparatus of FIG. 1 further includes a compare circuit 40 having output terminals 42, 44 and 46. The function of the compare circuit is to compare the signed magnitudes of the numbers A and B to determine whether A is less than B, in which case an output signal is provided on terminal 42, A is equal to B, in which case an output signal is provided on terminal 44, or A is greater than B in which case an output signal is provided on terminal 46. The signals A and B from input terminals 10 and 12 are applied to the input of the compare circuit 40. Additionally, the output of the carry circuit 30 is applied to the input of the compare circuit 40.

Figure 2:
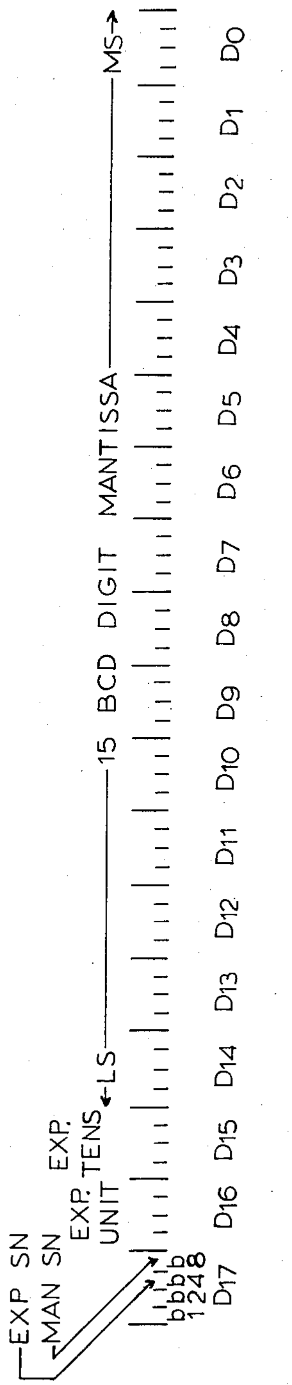
FIG. 2 illustrates an exemplary format of a multidigit binary coded decimal number employed in the preferred embodiment of the invention.

Attention is now called to FIG. 2 which illustrates an exemplary binary coded decimal format of a multidigit number which will be assumed herein for illustrative purposes. The format is comprised of 18 digit positions $D_0$–$D_{17}$. Each of these digit positions is comprised of four bit positions *b*1, *b*2, *b*4 and *b*8. *b*8 is the most significant bit position in each digit position. Thus, 72 bits of storage are required to define a single multidigit number in accordance with the exemplary format illustrated in FIG. 2. The 72 bit positions can be implemented by any suitable type of digital storage device, the particular type not being germane to the present invention. It will be assumed that the contents of the 72 bit positions is made available serially, bit by bit, least significant digit first, to the input terminals 10 and 12 of FIG. 1 with the digit positions becoming available in the order $D_{17}$, $D_{16}$, $D_{15}$ . . . $D_0$. Accordingly, 72 bit periods, which may hereinafter be referred to as a memory cycle are required to apply a number to the arithmetic apparatus of FIG. 1. In each digit position, the bit positions *b*1, *b*2, *b*4 and *b*8 will be available in that order. Thus, considering the time interval associated with a single multidigit number, bit position *b*1 of digit position $D_{17}$ will be available first, followed by bit position *b*2 of digit position $D_{17}$, followed by each of the succeeding bit positions going from left to right in FIG. 2 and ultimately concluding with bit position *b*8 of digit position $D_0$.

As shown in FIG. 2, it will be assumed herein that bit positions *b*1 and *b*2 of digit position $D_{17}$ are not used. Bit positions b4 and b8 of digit position $D_{17}$ of the exemplary format are respectively used to store the exponent sign and mantissa sign. Digit positions $D_{16}$ and $D_{15}$ are utilized to store the unit's digit and ten's digit of the exponent in binary coded decimal format. Thus, it will be appreciated that an exponent anywhere between 0 and 99 can be defined within digit positions $D_{15}$ and $D_{16}$. Inasmuch as the sign of the exponent is defined in bit position *b*4 of digit position $D_{17}$, an exponent having a value anywhere from −99 to +99 can be defined. Digit positions $D_{14}$–$D_0$ are utilized to define the multidigit mantissa in binary coded decimal format. Digit position $D_{14}$ will contain the least significant digit of the mantissa and digit position $D_0$ will contain the most significant digit. It is pointed out that the arithmetic apparatus disclosed herein functions to operate (e.g., add, subtract) on the mantissas of the applied numbers A and B, and it is assumed throughout that the numbers have been properly scaled so that the exponents thereof are equal.

It has been indicated that the bit positions of the 72 bit format shown in FIG. 2 are made available sequentially, one bit at a time to the input terminals of FIG. 1. Accordingly, it will be recognized that for nomenclature purposes, it can be considered that the content of any particular bit position will be available at the input terminal of FIG. 1 during a time slot expressed by the digit input positions corresponding thereto. Thus, it should be understood that time slot $D_{17}$, *b*4 for example, refers to the time slot during which the bit content of bit position 4 of digit position 17 is being made available at one of the terminals of FIG. 1.

Figures 3, 5A, 5B:
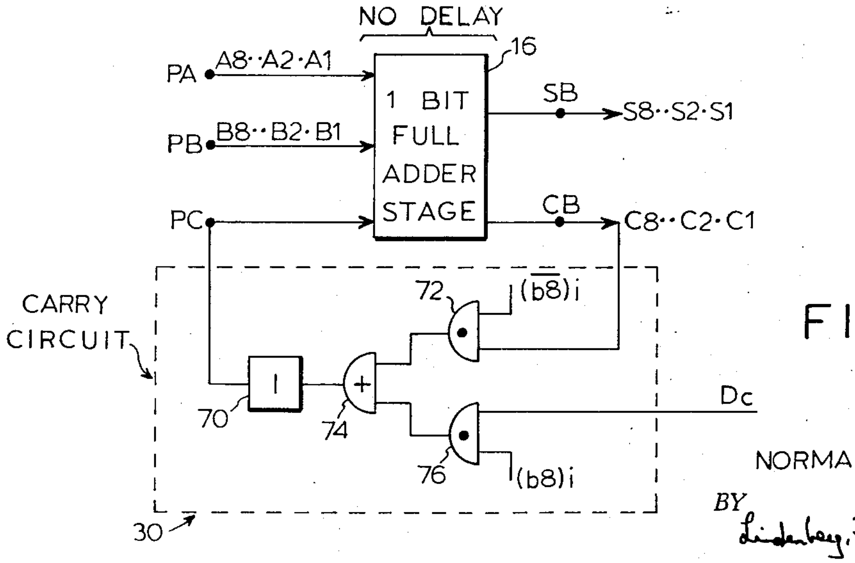
FIG. 3 is a table illustrating the operations which can be selectively performed by the arithmetic apparatus of FIG. 1.
FIG. 5A is a truth table illustrating the desired relationship between input and output of the full adder stage of FIG. 1.
FIG. 5B is a block diagram illustrating a preferred implementation of the full adder stage and carry circuit of FIG. 1.

Prior to describing the manner in which the nine's complement circuit 18 shown in detail in FIG. 4B operates, attention is called to FIG. 3 which illustrates the operation of the control circuit 26 to define the conditions under which the input number A, or its complement $A_c$, is applied to the input terminal $A_I$ of the full adder stage 16. As has been previously pointed out, the apparatus of FIG. 1 can selectively add, subtract, or compare the relative magnitudes of the two signed numbers respectively applied to the input terminals 10 and 12. As shown in FIG. 3, if an ADD operation is defined and the numbers A and B both have a positive sign, then gage 20 is enabled by the control circuit 26 to apply the true value of the input number A to the input of the adder stage 16. If however, the input number A is positive and the input number B negative, or the input number A negative and the input number B positive, then gate 22 is enabled to apply the complement ($A_c$) of the input number A to the adder stage input. If the signs of numbers A and B are both negative, then the true representation of the input number A is applied to the adder stage.

If a subtraction operation is defined, then if the signs of the numbers A and B are the same, the complement of A is applied to the adder stage. If the signs of the input numbers A and B are different, then the true representation of number A is applied to the adder stage. In the case of compare, as will be better understood hereinafter in connection with the discussion of FIGS. 7A and 7B, the gates 20 and 22 are controlled in the same manner as for subtraction.

Attention is now called to FIG. 4A which comprises a truth table illustrating the logical transposition to be performed by the nine's complement circuit 18 of FIG. 1. The 10 possible decimal digits are illustrated in the lefthand column of FIG. 4A and to the right thereof, the true binary code representations of the decimal digits are illustrated. The nine's complement codes are illustrated in FIG. 4A to the right of the binary codes.

It should be clear that the true and nine's complement representations of each of the decimal digits is determined from FIG. 4A by sighting across the page to the right from each of the decimal digits. Thus, the true binary code for decimal digit 3 is 0011 where the bit places are respectively identified as T8, T4, T2 and T1. The corresponding nine's complement bit places are represented by K8, K4, K2 and K1 and the nine's complement of the decimal digit 3 is equal to 0110. FIG. 4A also illustrates the logical equations expressing each of the nine's complement bits in terms of the true bits. Thus, equation (1) says that K1 is equal to the complement of T1. As a further example, logical equation (4) of FIG. 4A states that nine's complement bit K8 is true if the true bits T2, T4 and T8 are all false.

Attention is now called to FIG. 4B which illustrates a preferred implementation for transposing from the true binary codes shown in FIG. 4A to the corresponding nine's complement codes. In the implementation of the nine's complement circuit as shown in FIG. 4B, the bits of the true codes are sequentially applied to input terminal 50 which is coupled to logic gate network 54 through first and second serially connected one bit delay stages 56 and 58. Points P1, P2 and P3 respectively are connected to the input terminal 50, the output of delay stage 56, and the output of delay stage 58 are all connected to the input of the logic gate network 54. Thus, even though the bits of the true codes become available sequentially at the input terminal 50, the logic gate network 54 can, on the fly, simultaneously examine three bits at a time.

More particularly, consider at bit time *b1*, the true bit T1 of a four bit group is available at point P1. At bit time *b2*, the true bit T1 is available at point P2 and the true bit T2 is available at point P1. At bit time *b4*, the bits are all shifted one position to the right so that true bit T1 is available at point P3, T2 available at point P2, and T4 available at point P1. Similarly, at bit time *b8*, T2 is available at point P3, T4 at point P2, and T8 at point P1. Recall from equation (1) shown in FIG. 4A that the nine's complement bit K1 is equal to the complement of true bit T1. Since T1 is available on P1 at bit time *b1*, the nine's complement bit K1 can be developed at bit time *b1* as shown in FIG. 4B by the logic gate network 54 merely complementing the bit available at point P1 at time *b1* and outputting this value as K1 on the logic gate output terminal 60.

As is expressed by equation (2) of FIG. 4A, complement bit K2 can be developed as soon as true bit T2 is available which occurs at bit time *b2* in FIG. 4B. Thus, complement bit K2 is developed during bit time *b2* by merely coupling the bit appearing on point P1 to the logic gate network output terminal 60. Complement bit K4 requires that true bits T2 and T4 be available and this occurs at bit time *b4*. Thus, complement bit K4 is developed at bit time *b4* as expressed by the logical equation of FIG. 4B. Similarly, complement kit K8 is developed at bit time *b8* when the required true bits T2, T4 and T8 are available on points P1, P2 and P3.

From the foregoing it will be appreciated that the arrangement of FIG. 4B enables the nine's complement of the true binary values to be developed without any bit time delays as a consequence of utilizing the delay stages 56 and 58 connected in tandem which enable the logic gate network 54 to simultaneously examine bits spaced in real time. As will be apparent to one skilled in the art, the implementation of the logic gate network 54 to solve the logical equation shown in FIG. 4B can be easily accomplished merely by utilizing standard AND, OR and INVERTER circuits.

Attention is now called to FIG. 5A which illustrates the well known truth table of a full adder stage and to FIG. 5B which illustrates a block diagram of such a full adder stage together with a carry circuit in accordance with the present invention. More particularly, FIG. 5B illustrates the single bit full adder stage 16 and carry circuit 30 previously mentioned in connection with FIG. 1.

The full adder stage 16 is provided with two data input terminals designated PA and PB as well as a carry input terminal designated PC. The adder stage 16 in addition has sum and carry output terminals respectively designated SB and CB. The bits of the input numbers A and B are serially applied to the terminals PA and PB of the adder stage 16. Thus, for example, during a first bit period the bits A1 and B1 are simultaneously presented to the adder stage 16. During the next bit period, bits A2 and B2 of the two input numbers are applied to the adder stage 16. The bits of the binary sum appear serially on the output terminal SB without delay. Thus, the adder stage 16 produces the sum bit S1 on the output terminal SB during the same bit period as the input bits A1 and B1 are applied to the adder stage. Similarly, the sum bit S2 is supplied on output terminal SB during the same bit period that the bits A2 and B2 are applied to the stage 16. The carry bits are similarly made available at the carry output terminal CB without delay. Thus, the carry bit C1 formed as a consequence of the operation on input bits A1 and B1 is available on the carry output terminal CB during the same bit period as the sum bit S1 is available.

As noted the truth table of FIG. 5A shows the sum and carry bits produced by the full adder stage 16 in response to each of the eight different possible input conditions appearing on the terminals PA, PB and PC. The input to the carry input terminal PC is developed by the carry circuit 30. The carry circuit 30 includes a 1-bit delay stage 70 which permits the carry output signal developed during one bit period to be applied to the adder stage input during the succeeding bit period. The carry output bits C1, C2 and C4 during each digit period are coupled through the carry circuit 30 back to the adder stage carry input terminal PC during bit periods *b1*, *b2* and *b4* of each digit period. Thus, for example, the carry output bit C1 will be passed through enabled AND gate 72 during bit period *b1* and through OR gate 74 and will be applied to carry input terminal PC during the succeeding bit period *b2*. As indicated by the timing input to AND gate 72, the carry output bits available on adder stage output terminal CB will be passed through gate 72 during all bit periods other than bit period *b8* for application to the adder stage carry input terminal during the succeeding bit period. The carry bit passed by AND gate 72 during bit periods *b1*,

*b*2 and *b*4 will be referred to as intradigit carries. That is, the carries developed by the adder stage during these bit periods constitute carries between binary positions of the same four bit group representing a single decimal digit. On the other hand, AND gate 76 will be enabled during bit period *b*8 of each digit period to pass an interdigit carry $D_C$ developed by the B/BCD converter 32 for application to the carry input terminal of the full adder stage during the next bit period, i.e., bit period *b*1 of the succeeding digit period.

Attention is now called to FIG. 6A which illustrates a truth table for the B/BCD converter 32. The left most column of FIG. 6A identifies the decimal numbers 0–19 which represent the range of decimal numbers which can be developed as a consequence of summing two decimal digits plus a carry. Sighting across to the right from each of the decimal numbers, it will be noted that the binary equivalent of each of these decimal numbers is shown in the next succeeding five columns. Thus, the binary equivalent of decimal number 15, for example, is indicated as being 01111 where the zero constitutes the bit $C_8$ available at the output of the full adder stage 16 during bit period *b*8.

With further reference to FIG. 6A, it will be noted that the five columns to the right of the binary codes represent the codes of the corresponding decimal numbers in the binary coded decimal (BCD) format. Note that the column headed $D_C$ represents the interdigit carry column. It contains a 0 for decimal digits 0–9 and a 1 for decimal numbers 10–19. FIG. 6A also contains five logical equations describing the relationship between each of the BCD digits, respectively identified as D1, D2, D4 and D8 and the binary sum and carry digits S1, S2, S4 and S8 and C8 provided by the full adder stage 16. Equation (5) shown in FIG. 6A depicts the conditions upon which the interdigit carry $D_C$ is true.

Figure 6B:
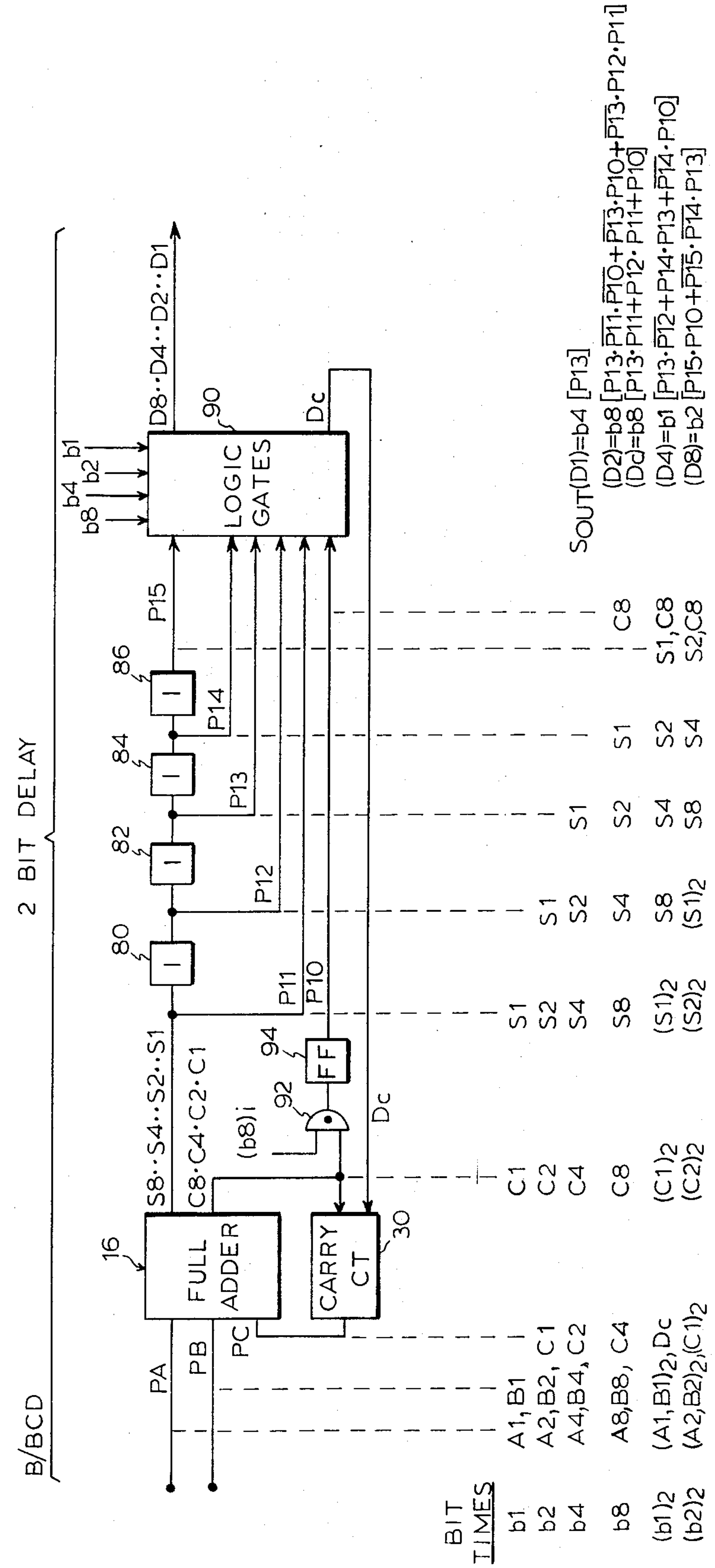
FIG. 6B is a block diagram illustrating a preferred implementation of the B/BCD converter of FIG. 1 to yield the relationships set forth in FIG. 5A.

Attention is now called to FIG. 6B which illustrates the manner in which the B/BCD converter 32 of FIG. 1 is implemented to provide the BCD codes shown in FIG. 6A in response to the application thereto of the corresponding binary codes of FIG. 6A. The implementation of the B/BCD converter as shown in FIG. 6B is similar to the implementation of the nine's complement circuit discussed in conjunction with FIG. 4B in that four 1-bit delay stages are connected in tandem to enable a logic gate network to simultaneously examine four bits spaced in time in order to develop the BCD code digits in accordance with the logical equations expressed in FIG. 6A.

More particularly, in the implementation of FIG. 6B, the sum output terminal of the full adder stage 16 is connected through four 1-bit delay stages 80, 82, 84 and 86 to the input of a logic gate network 90. The sum output terminal of the full adder stage 16 is identified in FIG. 6B as P11 and is connected directly to the logic network 90. The output points of delay stages 80, 82, 84 and 86 are respectively identified as P12, P13, P14 and P15. As is evidenced by the five logical equations shown in FIG. 6A, in order for the logic gate network 90 to develop the binary coded decimal digits D1, D2, D4 and D8 and the interdigit carry $D_C$, it is necessary that the carry bit C8 provided on the full adder stage output terminal be applied to the logic gate network 90. Thus, AND gate 92 is provided which is enabled during bit period b8 to pass the carry signal C8 developed by the full adder stage 16 to a flip-flop 94. The flip-flop 94 will hold the bit C8 provided to it during bit period b8 for a full digit period. The output of the flip-flop 94 is identified as P10 and is applied to the logic gate network 90.

At bit time *b*1, bits A1 and B1 of the applied input numbers are available at data input points PA and PB of the full adder stage 16. During the same bit time, the sum output bit S1 will be available on point P11 and the carry output bit C1 will be available at the adder stage carry output terminal. At bit time *b*2, the bits A2, B2 and C1 will be applied to the inputs of the adder stage 16. The sum bits S2 and S1 will be respectively available at the points P11 and P12. At bit time *b*4, the bits A4, B4 and C2 will be applied to the input of the adder stage 16. Carry output bit C4 will be available at carry output terminal adder stage 16 and sum output bits S4, S2 and S1 will be available at points P11, P12 and P13. As shown in FIG. 6B, the binary coded decimal bit D1 is developed during bit time *b*4 by looking at the bit concurrently available at point P13 which corresponds to bit S1. Thus, logical equation (1) of FIG. 6A is executed during bit time *b*4. During bit time *b*8, logical equations (2) and (5) are executed inasmuch as the terms necessary to determine bits D2 and $D_C$ are then available at the circuits points P10, P11, P12 and P13. During bit period *b*1 of the succeeding digit period, the BCD bit b4 is developed by the logic network 90 by examining the appropriate points P10, P12, P13 and P14 in accordance with logical equation (3) of FIG. 6A. Similarly, during bit period *b*2, BCD bit D8 is developed by the logic network 90 in accordance with equation (4) of FIG. 6A by examining points P10, P13, P14 and P15.

Thus, the logic gate network 90 is able to serially output bits D1, D2, D4 and D8, delayed two bits from the time at which the corresponding binary bits were applied to the adder stage 16. It will be readily recognized by those skilled in the art that the logic network 90 can be easily implemented to execute the logical equations shown in FIG. 6B.

Figures 7A, 7B:
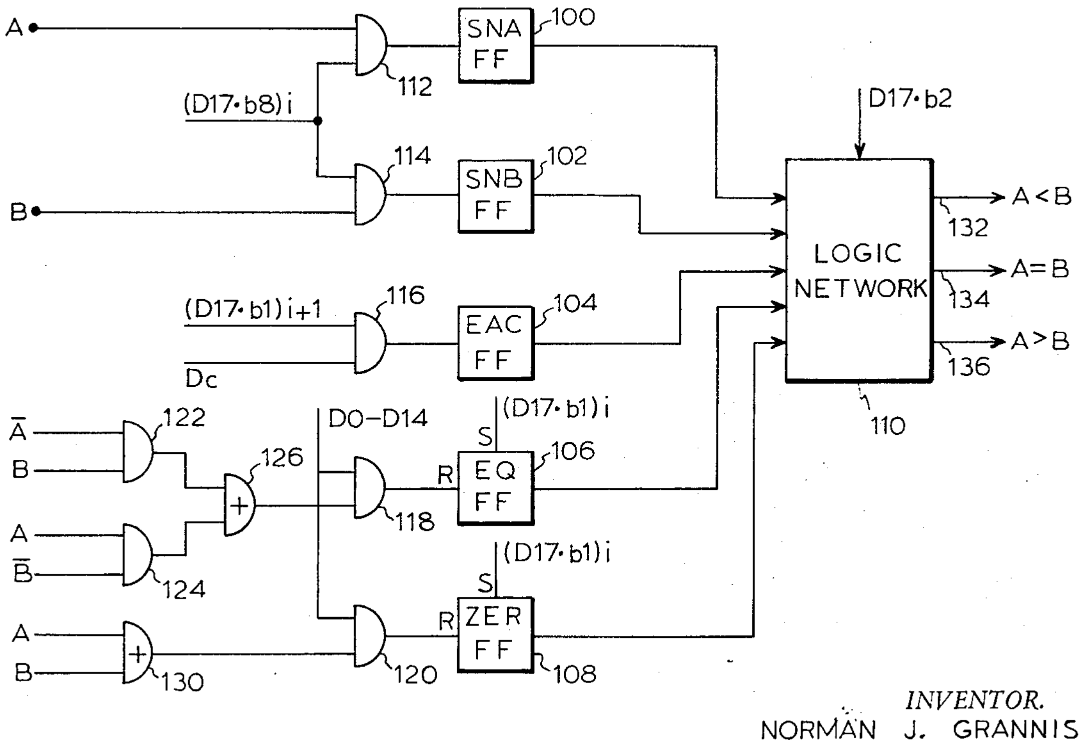
FIG. 7A is a truth table illustrating the desired relationship between the input and output of the compare circuit of FIG. 1.
FIG. 7B is a block diagram illustrating a preferred implementation of the compare circuit of FIG. 1.

Attention is now called to FIGS. 7A and 7B which relate to the comparison circuit 40 shown in FIG. 1. The implementation of the comparison circuit is shown in FIG. 7B and essentially is comprised of five principal flip-flops 100, 102, 104, 106 and 108 and a logic network 110. As will be explained in greater detail hereinafter, the states of each of the five flip-flops is established during some portion of the digit periods $D_{17}$–$D_0$ associated with the pair of multidigit numbers A and B being operated upon. For example, flip-flops 100 and 102 of FIG. 7B are intended to store representations of the algebraic signs of the multidigit numbers A and B respectively. As was pointed out in conjunction with FIG. 2, the sign of the mantissa is read during bit period *b*8 of digit period $D_{17}$. Thus, AND gates 112 and 114 are both enabled during bit period *b*8 of digit period $D_{17}$ to gate the respective bits associated with the numbers A and B into the flip-flops 100 and 102. The outputs of the flip-flops 100 and 102 are connected to the input of the logic network 110.

Flip-flop 104 constitutes an "END AROUND CARRY" flip-flop and is used to store the fact that the sum of the number representations applied to the adder stage 16 is in fact one digit in excess of the capacity of the storage means defining digit position $D_0$–$D_{17}$. In other words, the END AROUND CARRY flip-flop 104 is intended to store the fact that the B/BCD converter 32 provides an interdigit carry $D_C$ during the first bit period of a succeeding cycle defined by $(D_{17}, b1)_{i+1}$. This information is gated into the flip-flop 104 through gate 116.

Gates 106 and 108 respectively comprise an "EQUAL" flip-flop and a "ZERO" flip-flop. More particularly, if the absolute values of the numbers A and B are equal, then the flip-flop 106 is set to 1. If the absolute values of the numbers A and B are equal and are equal to zero, then the ZERO flip-flop 108 is set to 1.

Information controlling the flip-flops 106 and 108 is respectively gated through AND gates 118 and 120, both of which are enabled during all of the digit time periods $D_0$–$D_{14}$. The information input to gate 118 is derived from an Exclusive OR circuit comprised of AND gates 122 and 124 coupled to an OR gate 126. Assume that the EQUALS flip-flop 106 is set to a 1 state at the beginning of each cycle, i.e., digit period $D_{17}$, bit period $b1$. If at any time during the succeeding digit periods $D_{14}$–$D_0$, a bit of the A number fails to match the corresponding bit of the a number, then one of AND gates 122 and 124 will be enabled to reset the EQUALS flip-flop. Thus, if the numbers A and B are equal, at the end of the cycle, i.e., digit period $D_0$, $b8$, the EQUALS flip-flop 106 will be in a set state. If the numbers A and B are unequal, the EQUALS flip-flop at the end of the cycle will be in a 0 state.

The ZERO flip-flop 108 is also set at the beginning of a cycle, i.e., during bit period $b1$ of digit period $D_{17}$. The ZERO flip-flop 108 will be reset by the output of OR gate 130 if any of the bits of numbers A and B is a 1.

The logic network 110 will examine the states of the five flip-flops 100, 102, 104, 106 and 108 at bit per period $b2$ of digit period $D_{17}$ to determine the relative magnitudes of the numbers A and B applied to the apparatus during the prior cycle. The logic network is provided with output terminals 132, 134 and 136. In the event A is less than B, network 110 will provide a true signal on output terminal 132. If A equals B, a true signal will be provided on terminal 134 and if A is greater than B, a true signal will be provided on terminal 136.

The functioning of logic network 110 is described in the truth table of FIG. 7A. The five left most columns illustrate the various combination of states which can be held by the five flip-flops of FIG. 7B at the bit period $b2$ of a digit period $D_{17}$. The three right most columns illustrate the output signals presented on the output terminals 132, 134 and 136 in response to the sixteen different valid combinations of flip-flop states. For example, assume that the signs of both A and B are positive. From the table of FIG. 3, it will be recalled that in this case the complement $A_C$ of the true number A is applied to the full adder stage 16 meaning that the number A is effectively being subtracted from the number B. If an END AROUND CARRY fails to occur, then, as should be obvious, the number A is greater than the number B and as a consequence a true output signal will be provided on output terminal 136 of the logic network 110. On the other hand, as represented in line 13 of FIG. 7A, if an END AROUND CARRY does occur, then the number A is less than the number B. Further, if the signs of A and B are both positive, and if at the end of the cycle the EQUALS flip-flop 106 is true, then a true output signal is provided on output terminal 134 as indicated in lines 5 and 9 of FIG. 7A.

If the signs of numbers A and B are both negative, and if no END AROUND CARRY is developed, as represented in line 4 of FIG. 7A, A must be less than B. If an END AROUND CARRY is developed as indicated in line 16, then A must be greater than B. If the EQUALS flip-flop remains set at the end of the cycle as represented in lines 8 and 12, then A must be equal to B.

If the sign of A is positive and the sign of B is negative, then A must be greater than B as represented in lines 2, 10 and 14 of FIG. 7A. This is true except for the case where A and B are equal to 0 as represented in line 6 in which case the logic network output terminal 134 will be provided with a true signal to represent the equality between A and B. On the other hand, if the sign of A is negative and the sign of B is positive, the opposite output will be provided as represented in lines 3, 11 and 15.

From the foregoing it will be recognized that an arithmetic apparatus has been illustrated herein particularly suited for operating on signed numbers represented in a binary coded decimal format whose bits are presented serially. The apparatus is capable of selectively yielding the sum of difference expressed in binary coded decimal format as well as relative magnitude information. Although embodiments of the invention find their greatest utility in operating on binary coded decimal formatted numbers, it should be recognized that the teachings disclosed herein are also useful for operating on numbers represented in other non-binary formats where groups of two or more binary digits represent a single digit in a different radix number system.

What is claimed is:

1. Arithmetic apparatus useful for operating on first and second numbers represented in a binary coded decimal format whose bits are serially presented, said apparatus comprising:

a one bit full adder stage having first, second and carry input terminals and sum and carry output terminals; and binary to binary coded decimal converter means, said converter means including a plurality of single bit delay stages connected in tandem and a logic gate network having input terminals, each connected to a different one of said delay stages;

means connecting said adder stage sum output terminal to said tandem arrangement of delay stages;

means connecting said adder stage carry output terminal to an input terminal of said logic gate network;

said logic gate network having sum and carry output terminals;

carry circuit means selectively connecting either said adder stage carry output terminal or said logic gate network carry output terminal to said adder stage carry input terminal; and means coupled to said carry circuit means and said adder stage first and second input terminals for determining the relative magnitude of said first and second numbers.

2. The apparatus of claim 1 including means for coupling said bits of said first and second numbers to said adder stage first and second input terminals, said coupling means including selectively actuatable means responsive to said bits of said first number for applying bits representing the complement of said first number to said adder stage first input terminal.

3. The apparatus of claim 2 wherein said selectively actuatable means includes a plurality of single bit delay stages connected in tandem and logic gate means having input terminals connected to said delay stages for serially providing bits at an output terminal thereof representing the complement of said first number.

4. Arithmetic apparatus for use in combination with a data source providing first and second multidigit numbers, each represented in signed binary coded decimal format, said apparatus comprising:

timing means defining successive digit periods each comprised of four successive bit periods;

a one bit full adder stage having first, second and carry input terminals and sum and carry output terminals;

means responsive to said timing means for serially applying the bits of said first number, one bit during each bit period, to said adder stage first input terminal and the bits of said second number, one bit during each bit period, to said adder stage second input terminal for causing said adder stage to serially provide bits at said adder stage sum output terminal representing the sum of said first and second numbers in binary coded format;

delay means comprised of first, second, third, and fourth serially connected one bit period delay stages;

means coupling said adder stage sum output terminal to said delay means for producing each bit of said sum at the outputs of said first, second, third and fourth delay stages, respectively delayed by one, two, three and four bit periods from its availability at said adder stage sum output terminal;

logic means having input terminals connected to the outputs of said delay stages and to said adder stage carry output terminal for serially providing bits at a sum output terminal thereof representing said sum in binary coded decimal format each delayed by two bit periods from the availability of the corresponding bits at said adder stage sum output terminal and for providing during each digit period an interdigit carry signal at a carry output terminal thereof; and carry circuit means connecting said adder stage carry output terminal to said adder stage carry input terminal during three bit periods of each digit period for applying an interdigit carry signal thereto and connecting said logic means carry output terminal to said adder stage carry input terminal during one bit period of each digit period for applying said interdigit carry signal thereto.

5. The apparatus of claim 4 wherein said timing means defines a cycle including at least $n$ digit periods and wherein bits representing the magnitude of said first and second numbers in binary coded decimal format are available for application to said adder during $n-1$ of said $n$ digit periods and bits representing the algebraic signs of said first and second numbers are available during the one of said $n$ digit periods other than said $n-1$ periods.

6. The apparatus of claim 5 including selectively actuatable means responsive to said bits representing said algebraic signs for applying bits representing the complement of said first number to said adder stage first input terminal instead of said bits representing said first number.

7. The apparatus of claim 6 wherein said selectively actuatable means includes a plurality of single bit delay stages connected in tandem and logic gate means having input terminals connected to said delay stages for serially providing bits at an output terminal thereof representing the complement of said first number.

8. The apparatus of claim 5 including means for determining the relative magnitude of said first and second numbers including:

means responsive to said bits of said first and second numbers applied to said adder stage during said $n-1$ of said $n$ digit periods for indicating whether the magnitudes of said first and second numbers are equal to each other or are equal to zero; and logic network means responsive to said means indicating equality or zero and to said algebraic signs represented during said one digit period other than said $n-1$ periods and to said carry circuit means for indicating whether said first number is greater than, equal to, or less than said second number.

* * * * *